United States Patent [19]

Martin, Jr.

[11] Patent Number: 4,806,398
[45] Date of Patent: Feb. 21, 1989

[54] PAPER LAMINATE AND METHOD FOR PRODUCING THE LAMINATE AND PAPERBOARD CONTAINERS

[75] Inventor: Leslie L. Martin, Jr., Saginaw, Minn.

[73] Assignee: Potlatch Corporation, San Francisco, Calif.

[21] Appl. No.: 56,489

[22] Filed: May 29, 1987

[51] Int. Cl.$^4$ ............ B65D 15/22; B32B 27/00; B31B 1/64

[52] U.S. Cl. ............... 428/34.2; 156/244.11; 156/299; 426/127; 427/391; 428/349; 428/481; 428/483; 428/513; 428/910; 493/133

[58] Field of Search ............... 428/35, 481, 483, 349, 428/513, 910; 426/127; 156/244.11, 249.17, 299; 493/133; 427/391

[56] References Cited

U.S. PATENT DOCUMENTS

| Re. 32,270 | 10/1986 | Murray, Jr. . |
| 3,270,940 | 9/1966 | Egleston et al. . |
| 3,574,668 | 4/1971 | Cherney . |
| 3,916,048 | 10/1975 | Walles . |
| 3,924,013 | 12/1975 | Kane . |
| 3,939,025 | 2/1976 | Kane . |
| 3,967,998 | 7/1976 | Kane . |
| 3,972,467 | 8/1976 | Whillock et al. . |
| 4,147,836 | 4/1979 | Middleton et al. . |
| 4,300,969 | 11/1981 | Frydendal . |
| 4,343,858 | 8/1982 | Thompson . |
| 4,355,756 | 10/1982 | Furuya et al. ............ 428/481 |
| 4,455,184 | 6/1984 | Thompson . |
| 4,489,112 | 12/1984 | Wise et al. . |
| 4,513,036 | 4/1985 | Thompson et al. . |
| 4,537,815 | 8/1985 | Wise et al. . |
| 4,657,614 | 4/1987 | Andersson ............ 156/244.11 |
| 4,698,246 | 10/1987 | Gibbons ............ 428/483 |

FOREIGN PATENT DOCUMENTS 1078813  8/1967  United Kingdom .

OTHER PUBLICATIONS

PET: Basic Properties and Applications, John R. Newton, ICI American, Inc., 1986.
Metallized Polyester Challenges Aluminum Foil, John R. Newton, ICI American Inc., 1985.
High Barrier Materials, John R. Newton, ICI Americans, Inc., 1984.

Primary Examiner—Ellis P. Robinson
Assistant Examiner—James J. Seidleck
Attorney, Agent, or Firm—Wells, St. John & Roberts

[57] ABSTRACT

A laminated web is composed of a paper substrate having a layer of oriented polyethylene terephthalate film bonded to one surface and a layer of polyolefinic resin covering its second surface. The film presents an exposed surface having the known property of being heat sealable to itself, but is not heat sealable to polyolefinic resins. The web can be used successfully in the production of end products, such as containers, that include seams produced by employing flame heat sealing techniques. Flame activation of the sealed surfaces permits heat sealing of opposite surfaces of the web to one another without use of an adhesive. Containers produced by the use of this laminate evidence high retention of volatile materials and flavor oils commonly lost during storage of food products within containers made from paper laminates.

19 Claims, 2 Drawing Sheets

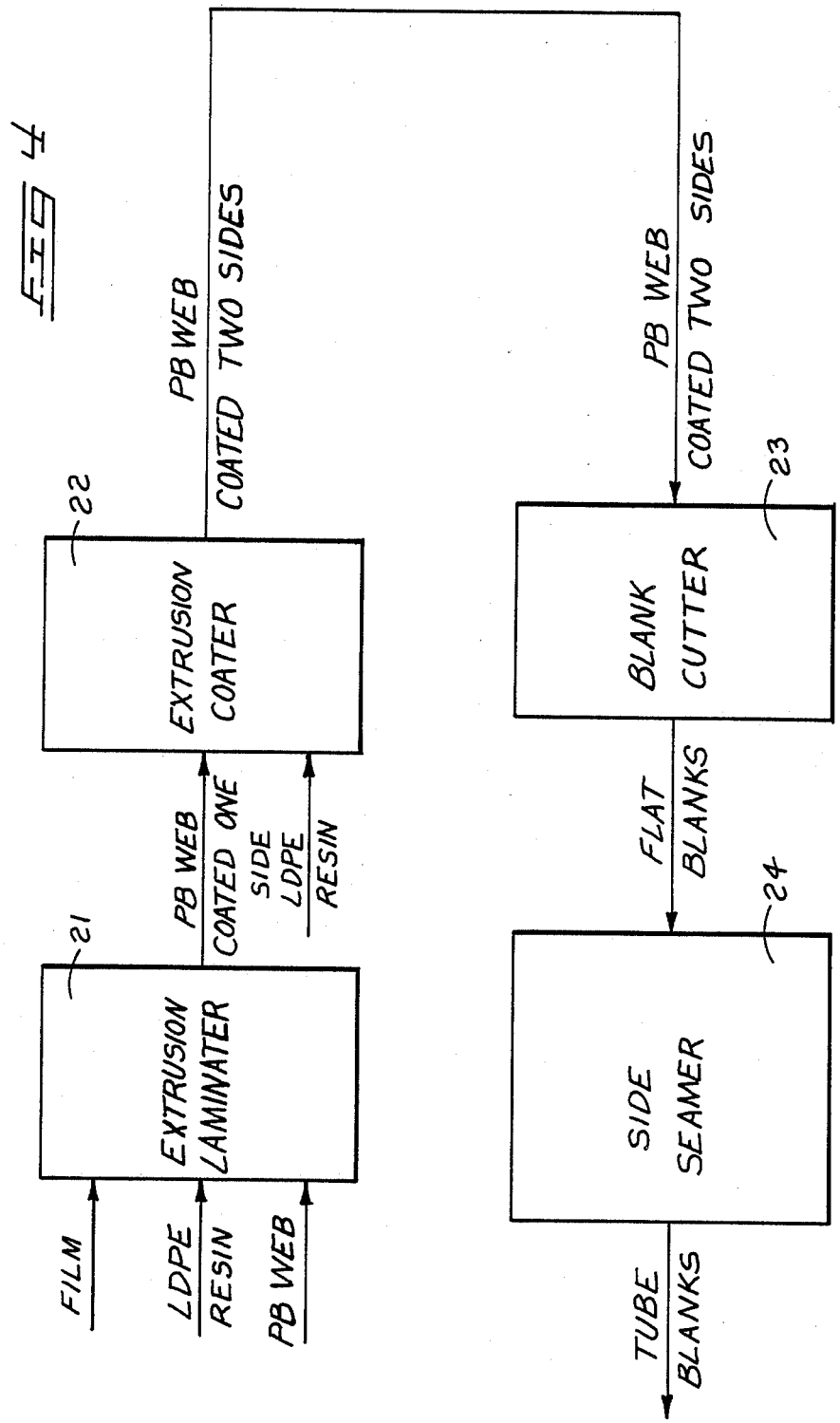

PAPER LAMINATE AND METHOD FOR PRODUCING THE LAMINATE AND PAPERBOARD CONTAINERS

TECHNICAL FIELD

This disclosure relates to laminated paper and containers made therefrom. It is particularly directed to paper laminates and paperboard containers for materials that have volatile components or that include oxygen degradable or light sensitive essential components.

BACKGROUND OF THE INVENTION

Paperboard cartons are widely used for packaging liquid food products, such as milk and fruit juices. It is typical to use resin coatings, films, and foils in one or more layers to provide a barrier between the contents of the container and the paperboard. The containers also are usually provided with exterior resin coatings that provide a water barrier, printable surface and improved container appearance. The exterior resin coatings are used in the formation of overlapping seals required during carton manufacture, set-up and sealing.

Aluminum foil lined paperboard cartons in use today have represented an initial step toward development of lighter, cheaper and more disposable paperboard packages for liquid foods which are oxygen and light sensitive. In such foil cartons, the inner material exposed to the packaged product has historically been polyethylene. It has been used because of its heat sealing capabilities, as well as low cost, organoleptic and governmental regulatory considerations. Unfortunately, however, polyethylene has the property of absorbing ethanol and many other organic chemicals, including flavor oils found in food products such as juices. This absorption property of polyethylene not only causes flavor loss during storage of food products, but can also result in lowered adhesion between the structural layers of the packages, particularly between foil and polyethylene layers. This has been identified even in the packaging and storing of the most common juices.

Current atempts to package wine in foil lined cartons have resulted in inconsistent seals over the required storage lives for the packages, apparently due to degradation of the polyethylene heat seals due to reactions caused by the ethanol content of the wine. These adhesion problems can be avoided by the use of special adhesive resins between layers in the laminate. But use of adhesive layers results in laminates having six or seven layers, which in turn requires special coextrusion equipment or multiple extruder passes to manufacture the laminate. The additional layers also add to material costs in a product area where low unit cost and high production quantities drive the economics of the industry.

A series of new paper substrate laminates have been appearing recently, reflecting current attempts to circumvent the organic absorption problem, simplify production procedures, and lower costs by using fewer layers while still maintaining good oxygen barrier properties. None of the paper laminates developed to this time appear to meet all of the criteria of light, volatile components and oxygen barrier characteristics, light weight, and ease of manufacture required for packaging of juice, wine or other oxygen and light sensitive products. They typically require complicated extrusion equipment and procedures, utilize expensive resins, fail to act effectively as barriers to prevent oxygen or light degradation of food or the loss of critical flavor oils, or fail to be compatible with existing carton manufacturing systems.

This disclosure describes a new paper laminate which improves on previously known laminates in these critical areas, including reduction in the combined laminate weights. Weight is important to shipping costs for the laminate and carton, but even more important to some end use applications, such as flight beverage services for commercial airlines, where reduced weight can be translated into fuel savings.

There have been numerous proposals made in the past for designing such paper substrate laminates to meet the barrier requirements for products susceptible to degradation during storage, such as fruit juices and wine, while also accommodating the physical operating requirements of existing machinery for handling such container blanks.

One example is shown in U.S. Pat. No. 3,927,245 to Roth et al. It describes a laminate in which an ethylene polymer coating is applied to the exterior laminate surface. A second ethylene polymer coating and an olefin polymer coating are coextruded on the inner laminate surface with the ethylene polymer contacting the base paperboard areas. Many variations in such a coextruded laminating coating have been introduced from time to time with varying degrees of success. However, coextruding some multiple resin layers on paperboard requires resin drying equipment and relatively complicated extruding equipment, making quality control difficult. Extrusion coated layers cannot be metallized to provide oxygen and light barrier capabilities.

A subsequent coextruded laminate coating was discussed in U.S. Pat. No. 4,455,184 to Thompson. Polyethylene terephthalate (PET) is utilized with a coextruded layer of polymeric adhesive interpositioned between the polyester resin and the underlying paperboard. While this attempts to gain the known barrier capabilities of polyethylene terephthalate in paperboard laminates for containers, it also encounters the inherent recognized difficulties relating to quality control in such technically complicated extrusion processes and fails to provide a resulting laminate readily adaptable to the flame heat seal seaming processes of common carton blank manufacturing operations.

An additional coextruded coating is shown in U.S. Pat. No. 4,513,036 (Thompson et al.) which teaches coextrusion of polypropylene and a covering coating of low density polyethylene to produce a coating amenable to side-seaming by direct flame systems. Tests of such containers have shown no effective oxygen barrier is exhibited by them. The sandwiching of the polypropylene layer under the polyethylene layer provides little improvement in flavor oil barriers beyond the usual properties of paperboard cartons having low density polyethylene interior coatings.

Another approach to producing such laminates is to laminate a film onto the paperboard layer, which leads to the possibility of metallizing the film to incorporate barrier properties similar to that obtained by metal foil linings. An example of a patent disclosure that teaches the lamination of a polyester film layer for this purpose is U.S. Pat. No. 3,972,467 to Whillock et al. In the disclosure, the laminated polyester film layer is covered by an extruded coating of polyethylene to impart required heat sealing properties to the composite. The resulting cartons exhibit marginal oxygen barrier properties and no improvement in flavor oil barrier properties, since the materials within the container are exposed directly to the polyethylene coating, which is known to exhibit a high degree of absorption.

A laminated paper material that incorporates a coextruded film composed of two or three layer combinations of ethylene-methyl acrylate copolymer and polyester is disclosed in U.S. Pat. No. 4,387,126. It is combined with foil by interposed bonding layers between the barrier and substrate surfaces. Heat sealing is provided by use of an innermost layer of polyolefin film.

Because the industry has recognized the desirable barrier capabilities of polyethylene terephthalate (PET) with respect to its use in the storage of volatile or degradable food products, many researchers and producers of paperboard cartons have attempted to incorporate this material into laminates for such containers. Of principal interest is a commercially introduced laminate having an exterior coating of low density polyethylene, and an inner coating of low density polyethylene sandwiched between the paperboard and an extruded layer of polyethylene terephthalate modified to be heat sealable. Depending on processing, the modification of the polyethylene terephthalate coating may show high levels of stress cracking and has been found to lose much of its moisture barrier properties, in turn requiring the utilization of the coating of low density polyethylene under it. The modification of the PET to make it heat sealable also appears to lower its flavor barrier properties. Because the polyethylene terephthalate is extrusion coated, it cannot be metallized to provide a good oxygen and light barrier within the containers. The multiple extrusion process used to produce this laminate requires complicated extrusion equipment and the handling of molten polyethylene terephthalate, which is recognized as a resin that is difficult to extrude. The unusual difficulties in coating paperboard with this resin cause this laminate to also exhibit inconsistent heat seal properties.

Flexible polyester films are widely used today in the packaging of materials, including food products, within heat-sealed film pouches. Such pouches are typically formed and sealed by pressing the inner surfaces of the sides of the pouch against one another between heated irons. Seals are effected between the abutting inner surfaces. To respond to such packaging needs, the producers of such films have developed coated and coextruded films having different properties at their outer and inner surfaces.

While such films are used in the production of flexible bags and pouches, they have not been found to be readily adaptable to the needs of conventional paperboard container converting equipment. In contrast to the relatively low temperatures and high pressures found in heat sealing applications for bags and pouches, paperboard container blanks are produced by exposing laminated flat blanks to high temperatures in very high speed flame seam sealers that produce lap side seams joining inner and outer surfaces of a flat blank. The temperatures, seaming pressures and speeds encountered in such machinery have posed serious problems in adapting high barrier films, such as polyethylene terephthalate, to the needs of paperboard container manufacturing operations.

The present invention arose inadvertently during tests attempting to use a coextruded oriented PET film as a vapor barrier within a paperboard container. Its discovery was contrary to all indications in published information pertaining to the film, which unequivocally stated that the heat sealable surface of the film would heat seal to a number of different materials, including itself, but not to polyolefins.

The present discovery arose during testing of luminations of flat paperboard blanks having the coextruded, dual-surface polyethylene terephthalate film bonded to both of their surfaces. When flat paperboard blanks formed from this laminate were activated by exposure to a direct flame, it was found that the "self sealable" surfaces of the film layers would not heat seal to one another to produce tubular blanks. A number of adhesive resins were tested on the outside surfaces of the blanks in an attempt to overcome this obstacle. Some did improve the lap seams, but those that showed promise were prohibitively expensive or had other problems.

By accident, laminates including the film and an exterior surface of low density polyethylene coated on the paperboard were tested, again using flame activation techiques followed by heat sealing. It was discovered that these blanks did produce a successful seam. This discovery lead to further testing in conventional flame heat sealing equipment and the development of the present invention. It appeared from the tests that the reason the heat sealable polyethylene terephthalate surfaces would not bond to one another after being activated by exposure to a flame was the surface oxidation that resulted from the high level of flame exposure. The exposure level is much greater than that which results from flame priming, which similarly exposes the film surface to an open flame. The heat sealable polyester will still bond to itself and not to polyethylene after such priming. Apparently oxidation facilitates heat sealing of the outer polyethylene terephthalate surface to a polyolefinic resin, such as polyethylene. Exposure to the flame must "activate" the polyethylene terephthalate and polyethylene surfaces to effect bonding when subjected to a seam sealer. To those familiar with the art, activation is judged adequate when the resin surfaces take on a slightly roughened look, but do not discolor. This activation may be followed rapidly by flame heat sealing, as in a flame lap seam sealer, or may take place as a separate step, followed by non-flame heat sealing.

The products and processes described herein provide a paper substrate-plastic film laminate which offers improved oxygen protection and volatile flavor oil retention at costs significantly less than those now required to produce foil lined cartons. When the film is metallized, the laminate offers moisture, light and oxygen protection similar to that found in foil lined cartons and much better volatile flavor oil retention at a cost still less than that required for foil lined cartons. The laminate presents a high barrier liquid packaging structure which can be produced in a single pass on any tandem extruder equipped with a laminating station. The extruder need only to be able to run the most common thermoplastic resins (typically low density polyethylene) without any additional equipment, such as dryers. The laminate presents the possibility of developing a liquid container suitable for packaging of wine and other oxygen-sensitive products, with a substantial weight reduction in comparison to conventional glass bottles and with even a fifteen percent weight reduction over the foil lined cartons currently in limited use. The package is expected to exhibit improved wine flavor retention, based upon the recognized properties of the resins incorporated within this new laminate.

BRIEF DESCRIPTION OF THE DRAWINGS

The preferred embodiment of the invention is illustrated in the accompanying drawings, in which:

FIG. 4 is a simplified flow diagram of the steps involved in producing the laminate and cartons.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

This disclosure will make reference to several terms commonly used in referring to seaming systems for resin laminates in the packaging industry. "Heat sealing" shall generally include all seaming systems where application of heat and pressure to resin surfaces results in a structural bond between them. Included within this broad definition are "flame heat sealing" systems, where the seaming surfaces of the resin are directly exposed to a flame and are "activated", either during or prior to heat sealing; and "non-flame heat sealing" systems, where the surfaces might be primed (but not "activated") and heat is then applied to the surfaces, along with application of pressure, by hot air, heated irons, radiant heat, microwave energy, sonic energy or any heat source other than direct flame contact. "Priming" of the resin surfaces shall include any surface preparation technique that facilitates subsequent non-flame heat sealing, including exposure to corona discharge, flame heat or chemical treatment, but falls short of "activation". "Activation" of the resin surface results from exposure of the resin surfaces to direct flame application to an extent that it results in surface oxidation and some degradation of the exposed resin surfaces.

Figure 1:
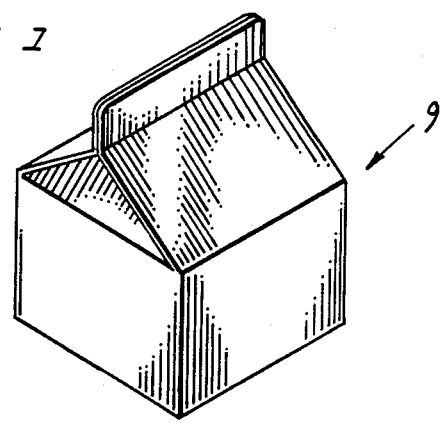
FIG. 1 is a perspective of a typical paperboard carton.

As one example of an end use application for the present laminate, FIG. 1 shows a laminated paperboard carton construction widely used for packaging liquid food products, including milk and fruit juices. The paperboard stock or substrate has coated interior surfaces that provide a barrier between the contents of the container and the underlying structural paperboard. An exterior coating improves the appearance and functionality of the carton and is a component in a heat seal required during its production, set-up and sealing.

The manufacture of such containers involves coating both sides of the paperboard stock in a continuous web, as well as printing, scoring and cutting to the shape and dimensions required in individual flat blanks. The outer surface of a flap and a complementary inner surface on each flat blank are typically heated by a direct flame seam sealer while the heated carton blank surfaces are essentially unsupported—not compressed between two heating jaws, as would be the case in other forms of non-flame heat sealer applications. The complementary overlapping areas of each blank are then brought in contact with pressure to form a flattened tube blank having a lap seal that serves as a liquid-tight side seam in the final carton. The flattened tube blanks are shipped to end users, such as dairies or juice manufacturers, who erect the blanks, complete them by further non-flame heat sealing, fill them and finally complete the sealing operations.

The illustrated blanks have been adapted to production techniques and equipment which must be operated at the highest possible rates of speed. The high production speeds of blank seaming machinery normally dictate that flame seam sealers be utilized, since alternative sealing equipment, which would typically require use of adhesive, contact by heated surfaces or application of heated air, are substantially slower and therefore add to the unit cost of each carton.

It is also essential to design new laminates which match the requirements of existing machinery with regard to the coefficient of friction between the outer surfaces of the carton and the metal conveying surfaces of associated equipment, such as filling lines. Since paperboard cartons having polyethylene exterior surfaces have become the standard in this industry, it is desirable to utilize such exterior coatings in paperboard laminates whenever possible. The challenge posed to the industry by these limitations is therefore to identify superior inside container coatings which can effectively form lap seams with exterior polyethylene coatings when subjected to conventional carton manufacturing machinery.

Figure 2:
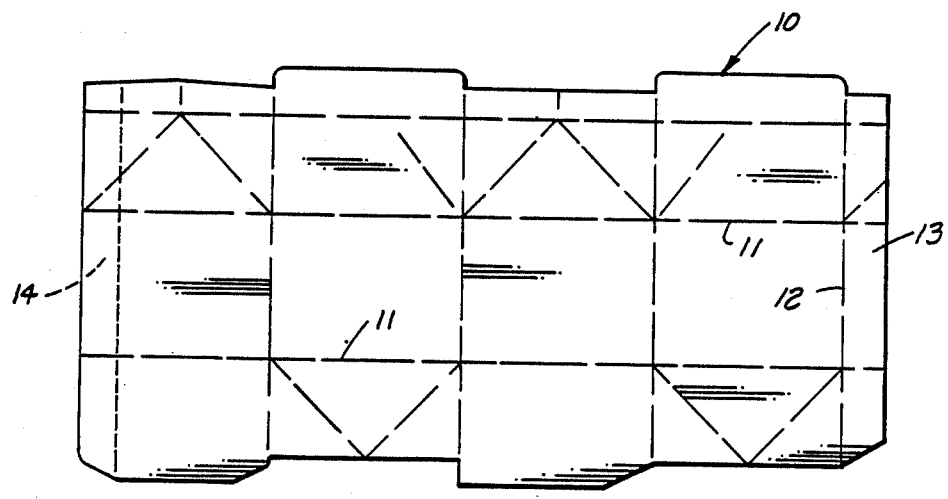
FIG. 2 is a plan view of a carton blank.

With reference to FIG. 1, a completed carton 9 is illustrated as prepared from a carton blank made in accord with the present invention. FIG. 2 shows an example of a flat carton blank in its original planar condition. The flat blank 10 has been cut to the required shape and size for producing a container from a continuous web of the laminate (not shown) and has score lines 11 to facilitate subsequent folding of the panels and flaps that define the container components. The score line 12 serves as a boundary along a flap 12, which, when assembled, overlaps the underside of an area of the blank designated by the reference numeral 14. The overlapping areas 13 and 14 are sealed to one another to form the side seal of the final carton along one of its vertical corners. Such carton blanks, and resulting cartons, other than the specific coatings arranged on their surfaces, are standard in the packaging industry and need not be further described herein.

Figure 3:
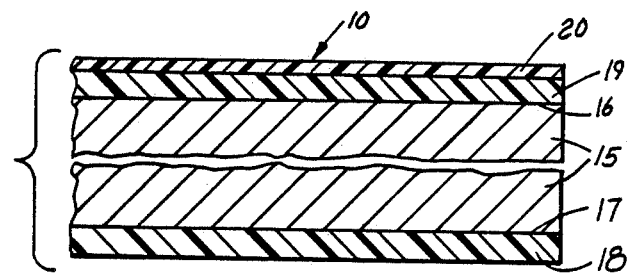
FIG. 3 is an enlarged fragmentary cross sectional view through the laminate.

FIG. 3 is a cross sectional view through one preferred embodiment of the present laminate, identifying the various components included in the coated paperboard substrate. The structure consists of the usual paper substrate 15 having opposed first and second surfaces 16 and 17 which ultimately will face inwardly and outwardly, respectively, in the completed container. A layer of biaxially oriented polyethylene terephthalate (PET) film 20 has one surface bonded to the first surface 16 of the paperboard stock 15. Its remaining surface is exposed. A layer of a polyolefinic resin 18, such as low density polyethylene (LDPE) resin, covers the second surface 17 of the paperboard stock 15. A laminating resin 19 is interpositioned between the PET film 20 and surface 16 to adhere the film to the paperboard stock 15. At present, low density polyethylene (LDPE) has been found to provide both acceptable adhesion for film 20 and an acceptable covering for surface 17. Other polyethylene resins and a variety of known adhesive resins other than polyethylenes can be used successfully between film 20 and surface 16, including many different polyolefins, modified polyolefins, ionomers and even PET itself. The specific choice of adhesive resin will be based upon economics, equipment limitations, resin availability and compatibility with the primed or metallized film surface being bonded to the paperboard layer. It is believed that the selection and use of such laminating resins is well known and within the usual skills of those having experience in laminating of paperboard for container applications.

The paper substrate 15 can be any paper or paperboard stock or web of sufficient thickness for its intended purpose. For containers, the thickness must be such that the containers will hold their shape when filled. The substrate must also be sufficiently thick to serve as a protective heat sink, preventing the laminated resins on the substrate from melting during their exposure to heat within a conventional flame seam sealer. For other product manufacturing purposes than usual in paperboard, a paper web of less thickness might be more appropriate.

The polyethylene terephthalate film used in the laminated web is a thin film of oriented polyethylene terephthalate having an exposed surface which has recognized heat sealable characteristics. The heat sealing characteristics can be produced by chemical means. An example of a process for chemically modifying one surface of a crystalline polyethylene terephthalate film to render it amorphous and heat-sealable, by acid treatment, is disclosed in U.S. Pat. No. 3,357,784. Polyethylene terephthalate films have also been made heat sealable by the addition of coatings, as disclosed in U.S. Pat. No. 4,391,767 and U.K. Patent Specification No. 1,078,813. Laminated films of polyethylene terephthalate have also been produced with one polyester layer being modified and of a type which remains amorphous after orientation and provides heat sealing characteristics of the film. An example of such a film is described in U.S. Pat. No. 4,405,400. Heat sealing characteristics can also be provided on polyethylene terephthalate films by co-extruding a laminate, using two or more polyester polymers, one being highly crystalline and the other non crystalline. An example is illustrated in the disclosure of U.S. Pat. No. 4,011,358.

In a preferred embodiment of the invention, the film utilized is a coextruded, dual-surface polyester film available from ICI Americas, Inc., in Wilmington, Del., and identified by its trademark MELINEX 850. MELINEX 850 film is one of a number of coextruded PET film products produced by their manufacturer. While the manufacturer has not released information detailing the chemical nature of the film, our spectral analyses have failed to identify any substantial resin components in such films other than polyethylene terephthalate (PET).

The published technical data for MELINEX 850 and published data relating to its heat sealing properties (both attached as appendixes to this specification) disclose that one surface of MELINEX 850 film has the same properties as its related polyethylene terephthalate films, but the other surface has entirely new properties, the principal one being heat sealability. Microscopic observation of the film surfaces indicates that the self-sealing surface of MELINEX 850 film has a noncrystalline or amorphous polymeric structure. It is clearly distinguishable from the crystalline polymeric structure of the "normal" polyethylene terephthalate film evidenced at its opposite surface.

Attached as an appendix to this patent application is a copy of the published technical data sheet for MELINEX 850 film, and a copy of a related paper, dated July, 1984, and titled "MELINEX 850—Heat Sealing Properties".

The published information concerning heat sealability of the modified surface included in MELINEX 850 film is apparently concerned with non-flame heat sealing techniques, which typically utilize heated irons or hot air at temperature ranges substantially below those encountered in high production flame heat sealing techniques. The heat sealable surface of MELINEX 850 film is reported by the manufacturer to be sealable to itself, as well as to the normal oriented polyethylene terephthalate surface presented at the opposite side of the film. It is also reported to be sealable to foil, paper, and glass, but will "not heat seal to polyethylene or polypropylene".

In a preferred embodiment of this invention, the plain or normal oriented polyethylene terephthalate surface of MELINEX 850 film 20 is extrusion laminated to the first surface 16 of the paper substrate 15 in a continuous web. The extrusion laminating resin layer 19 may be any resin which provides adequate adhesion to the contacted oriented polyethylene terephthalate surface or metallized surface facing toward the paper substrate 15. The remaining surface of film 20, exposed at the exterior of the laminate, therefore has the known property of being heat sealable to itself, but is reported to be not heat sealable to polyethylene.

In a separate step which may precede or follow film lamination (but in a single pass on a tandem extruder) the second surface 17 of the paperboard stock 15 is extrusion coated with a layer of polyethylene 18. The layer of polyethylene 18 can then be subjected to a matte-finish chill roll or other mechanical or chemical treatment to modify its coefficient of friction to match known requirements of the carton industry. Such treatments are well known in design and production of polyethylene coated paperboard laminates of this type. In all other physical aspects, cartons made from this laminate will match the exterior specifications of conventional cartons and will run on existing packaging equipment.

The unexpected discovery which was the foundation of this disclosure was that the exposed heat sealable surface of the polyester film did form an effective lap seal with the opposed polyethylene coated surface when run through a standard flame side seam sealer of the type used in typical carton blank side seaming machinery. This was surprising, not only because of the reported information that the surfaces would not heat seal to polyolefins, but also because of further experimental tests that had shown the modified polyethylene terephthalate surfaces of this film to be incapable of sealing to themselves after exposure to flame sealing equipment. It is believed that this observed loss of ability to self-heat seal was caused by surface oxidation of the oriented polyethylene terephthalate areas when activated by exposure to the direct flame. However, this oxidation, if it occurred, apparently predisposed the surface to seal with polyethylene resins in a flame sealer environment.

The development of this invention was surprising because neither normal oriented polyethylene terephthalate films nor the heat sealable surfaces of such films will heat seal to polyethylene at strength levels sufficient for the inside to outside overlapping seams required in paperboard type liquid packaging containers, even after exposure to normal corona or flame priming to promote adhesion. In the past, the only known methods for producing such containers using oriented polyethylene terephthalate film were to either use a secondary adhesive on the lap seams, which is slow and costly, or to overcoat the oriented polyethylene terephthalate film with a different heat sealable resin, which presents an exposed area of resin to absorb flavor oils from the container contents.

Liquid containers for juice and other food products having volatile essential flavor oils have been manufactured successfully by using MELINEX 850 film at the inside of the cartons as described above. The film preferably has a gauge of 100 or less, 48 gauge film having been used to date.

One big advantage of this system is the ability to metallize the normal oriented polyethylene terephthalate surface of the film. Metallizing of the film on its non-heat seal surface is available from commercial sources and is now applied to flexible film packages made from the film. Metallizing is generally described in U.S. Pat. No. 3,916,048. One commercial example is BARRIER-MET metallized film available from Vacumet Corp., of Wayne, N.J. When metallized, the film 20 can be extrusion laminated to the paper substrate 15 without any further initial treatment. When film 20 is laminated to the paper substrate 15 without metallizing, it is desirable to prime the normal oriented polyethylene terephthalate surface of the film to be in contact with the laminating resin just before the lamination procedure. Flame, corona or chemical priming treatments can be used. Such treatment methods are well known to those skilled in this field.

The use of MELINEX 850 film is preferred as the starting material for production of this laminate since it forms strong hot air or hot bar heat/seals as needed on all the inside-to inside facing seals formed in a typical carton. It will be readily understood that other heat sealable oriented PET films available from ICI or other film sources can be substituted in place of MELINEX 850 to produce the paperboard laminate. For instance, ICI produces a film identified by the trademark MELINEX 855, which is coextruded in three layers to produce two self-sealing PET surfaces at opposite sides of the film. ICI has also furnished an experimental film identified by the trademark MELINEX 3093, which has a double thickness heat seal layer of PET at one side. The properties of MELINEX 3093 are outlined in the preliminary technical data sheet for this film, included in the appendix to this application. Both films have demonstrated good ability to produce a seal with polyethylene resins on paperboard stock when exposed to flame sealing equipment. The present disclosure is to be interpreted as encompassing the utilization of oriented polyethylene terephthalate films in a paper substrate laminate having an exposed self heat sealable surface identical to or functionally equivalent to the heat sealable surfaces presented by the identified MELINEX series of heat sealable films.

FIG. 4 graphically illustrates the process for coating paperboard stock according to this disclosure and the process for improving the resistance of paperboard to the migration of volatiles therethrough from a material containing such volatiles within a completed container.

The process for coating the paper substrate in a web involves extrusion laminating one side of a biaxially oriented polyethylene terephthalate film to a first side of the paper substrate. The exposed remaining side of the film has the property of being heat sealable to itself. This step is accomplished within a conventional extrusion laminater generally indicated in FIG. 4 by the reference numeral 21.

The resulting web, coated on one side by the film, is next passed through an extrusion coater 22 that applies polyethylene resin to the reverse surface of the paper substrate. A matte-finish chill roll can be used to produce the required coefficient of friction at the exterior surfaces of the laminate. The web can then be scored and cut to shape in a blank cutter 23. The coated flat blanks are then fed through conventional side seaming machinery 24, using flame lap seam sealers to produce the lap side seams described above with respect to FIGS. 1 and 2. The flattened tube blanks are then shipped to end users for completion, filling and sealing procedures well known in this industry.

It is to be understood that the flame heat sealing steps required during side seaming of the carton blanks can be accomplished sequentially by first activating the seam surfaces by exposure to an open flame and subsequently non-flame heat sealing the two surfaces. The non-flame heat sealing step might utilize any conventional heat source, including hot air, microwave energy, sonic energy and radiant surfaces in a contact or non-contact mode.

The following table illustrates comparable retention of vitamin C and d-limonene flavor oil in orange juice after storage in sealed cartons produced from five different laminate structures. The sequence of layers in each laminate is listed in their structural order, using acronyms and trademarks conventional in this industry when making reference to paperboard (PB) laminate components. The structures of laminates 1 through 5 are respectively as follows:

Laminate 1:
MELINEX 850/METALLIZED/LDPE/PB/LDPE
(Metallized PET Film)
Laminate 2:
MELINEX 850/LDPE/PB/LDPE
(Unmetallized PET Film)
Laminate 3:
KODABOND PET 5116/LDPE/PB/LDPE
(Extruded PET Coating)
Laminate 4:
LDPE/SURLYN 1652/FOIL/SURLYN 1652/LDPE/PB/LDPE
(Standard Foil Juice Board)
Laminate 5:
LDPE/PB/LDPE
(Typical Milk Carton)

TABLE I

|  | % Vitamin C Retained In Half Gallons After 21 Days @ 40° F. | % d-Limonene Flavor Oil Retained in Half Gallons After 21 Days @ 40° F. |
| --- | --- | --- |
| Laminate 1 | 62 | 67 |
| Laminate 2 | 54 | 73 |
| Laminate 3 | 56 | 50 |
| Laminate 4 | 59 | 30 |
| Laminate 5 | 33 | 13 |

Table I demonstrates exceptional retention of both Vitamin C and d-limonene flavor oil by utilization of polyethylene terephthalate in this laminate. These results are explainable by the higher quality of seal that results from use of an interior film barrier rather than a coating barrier, since quality control of coating characteristics is very difficult to maintain. While extrusion coated polyethylene terephthalate laminates (laminate 3) have met with limited success, laminated using oriented polyethylene terephthalate film can produce better barrier properties with approximately half the total coating thickness and better flavor retention due to slight flavor oil absorption by the thick, modified PET coating. Furthermore, paper substrates can be laminated to films up to 300 fpm faster than is currently possible in the operation of extrusion coaters with PET. The lamination of a film to a paper substrate eliminates the difficult control problems presented by handling of liquified polyethylene terephthalate resins, which are extremely susceptible to moisture variations. In actual practice, structures using coatings of polyethylene terephthalate have been found to show excessive levels of stress cracking and inconsistent flame lap seals, while the consistent sealing properties and toughness available by use of oriented films are believed to be self evident.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A paperboard container, the container being constructed from a laminate comprising:
   a paper substrate having opposed first and second surfaces;
   a layer of preformed biaxially oriented polyethylene terephthalate film having one surface bonded to the first surface of the paper substrate and its remaining surface being exposed, the remaining surface of the film having the property of being heat sealable to itself; and
   a layer of polyolefinic resin covering the second surface of the paper substrate;
   the container having at least one seam formed by overlapping activated areas of the polyethylene terephthalate film and polyolefinic resin activated and bonded to one another by flame heat sealing techniques without interposition of an adhesive.

2. The paperboard container of claim 1 wherein the one surface of the film has a crystalline polymeric structure.

3. The paperboard container of claim 1 wherein the one surface of the film is metallized.

4. The paperboard container of claim 1 wherein the preformed biaxially oriented polyethylene terephthalate film is a coextruded dual-surface polyester film, the one surface of the film having a crystalline polymeric structure and the remaining surface of the film having a noncrystalline or amorphous polymeric structure.

5. The paperboard container of claim 1 wherein the preformed biaxially oriented polyethylene terephthalate film is a coextruded dual-surface polyester film having a gauge of 100 or less, the one surface of the film having a crystalline polymeric structure and the remaining surface of the film having a noncrystalline or amorphous polymeric structure.

6. The paperboard container of claim 1 wherein the one film surface is bonded to the first surface of the paper substrate by an interposed layer of a laminating resin.

7. A flattened tube blank for erection and sealing as a container, the tube blank being formed of the following laminate:
   a paperboard layer;
   a layer of a polyolefinic resin bonded to the outer surface of the paperboard layer; and
   a preformed layer of biaxially oriented polyethylene terephthalate film covering the inner surface of the paperboard layer, the film having one surface thereof bonded to the paperboard layer, its remaining surface having the property of being heat sealable to itself and being exposed inwardly within the tube blank;
   the tube blank having a side seam formed by overlapping surfaces of the polyethylene terephthalate film and polyolefinic resin activated and bonded to one another by flame heat sealing without interposition of an adhesive.

8. The flattened tube blank of claim 7 wherein the one surface of the film has a crystalline polymeric structure.

9. The flattened tube blank of claim 7 wherein a layer of a laminating resin is interposed between the one surface of the film and the paperboard layer.

10. The flattened tube blank of claim 7 wherein the one surface of the film is metallized.

11. The flattened tube blank of claim 7 wherein the preformed biaxially oriented polyethylene terephthalate film is a coextruded dual-surface polyester film, the one surface of the film having a crystalline polymeric structure and the remaining surface of the film having a noncrystalline or amorphous polymeric structure.

12. The flattened tube blank of claim 7 wherein the preformed biaxially oriented polyethylene terephthalate film is a coextruded dual-surface polyester film, the one surface of the film having a crystalline polymeric structure and the remaining surface of the film having a noncrystalline or amorphous polymeric structure having a gauge less than 100.

13. A process for improving the resistance of a paper substrate to the migration or absorption of volatiles from a packaged material, comprising the following steps:
   bonding a first surface of the paper substrate to one surface of a preformed layer of biaxially oriented polyethylene terephthalate film, the remaining film surface having the property of being heat sealable to itself;
   coating the remaining surface of the paper substrate with a polyolefinic resin; and
   manufacturing a container by exposing the coated outer surface of the paper substrate and the remaining surface of the film to a flame to activate and bond the surfaces during utilization of flame heat sealing techniques without interposition of an adhesive.

14. The process of claim 13 wherein the one surface of the film has a crystalline polymeric structure.

15. The process of claim 13 wherein the step of bonding the first surface of the paper substrate to the one surface of the film includes interpositioning a coating of laminating resin between them.

16. The process of claim 13 wherein the step of bonding the first surface of the paper substrate to the one surface of the film is preceded by the following substeps:
   treating the one surface of the film by corona discharge; and interpositioning a coating of a polyolefinic resin between the first surface of the paper substrate and the one surface of the film.

17. The process of claim 13 wherein the step of bonding the first surface of the paper substrate to the one surface of the film is preceded by the following substeps:

metallizing the one surface of the film; and interpositioning a coating of laminating resin between the first surface of the paper substrate and the one surface of the film chosen from the group comprising polyolefins, modified polyolefins and ionomers.

18. The process of claim 13 wherein the oriented polyethylene terephthalate film is a coextruded dual-surface polyester film, the one surface of the film having a crystalline polymeric structure and the remaining surface of the film having a noncrystalline or amorphous polymeric structure.

19. The process of claim 13 wherein the preformed biaxially oriented polyethylene terephthalate film is a coextruded dual-surface polyester film having a gauge of 100 or less, the one surface of the film having a crystalline polymeric structure and the remaining surface of the film having a noncrystalline or amorphous polymeric structure.

* * * * *